March 8, 1960
D. A. MURRAY ET AL
2,927,651
GAUGE WHEEL FOR TWO-WAY PLOW
Filed Feb. 15, 1957
3 Sheets-Sheet 2
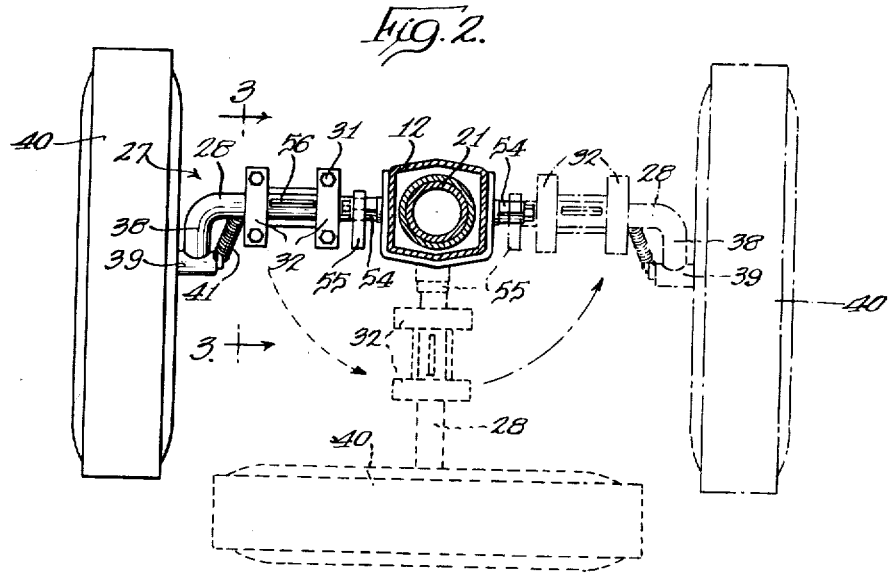
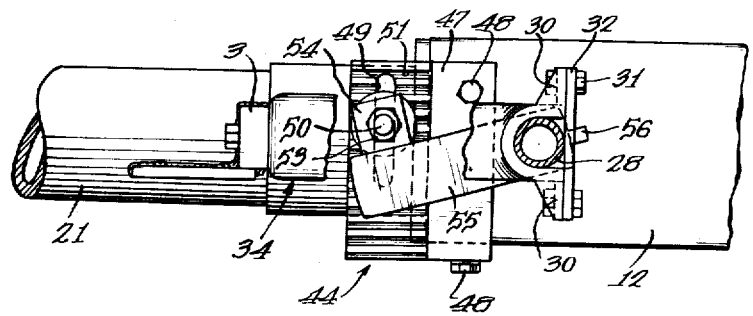
INVENTORS.
Donald A. Murray
Donald F. Christofferson
Wayne G. Toland
By: Paul O. Pippel
Atty.

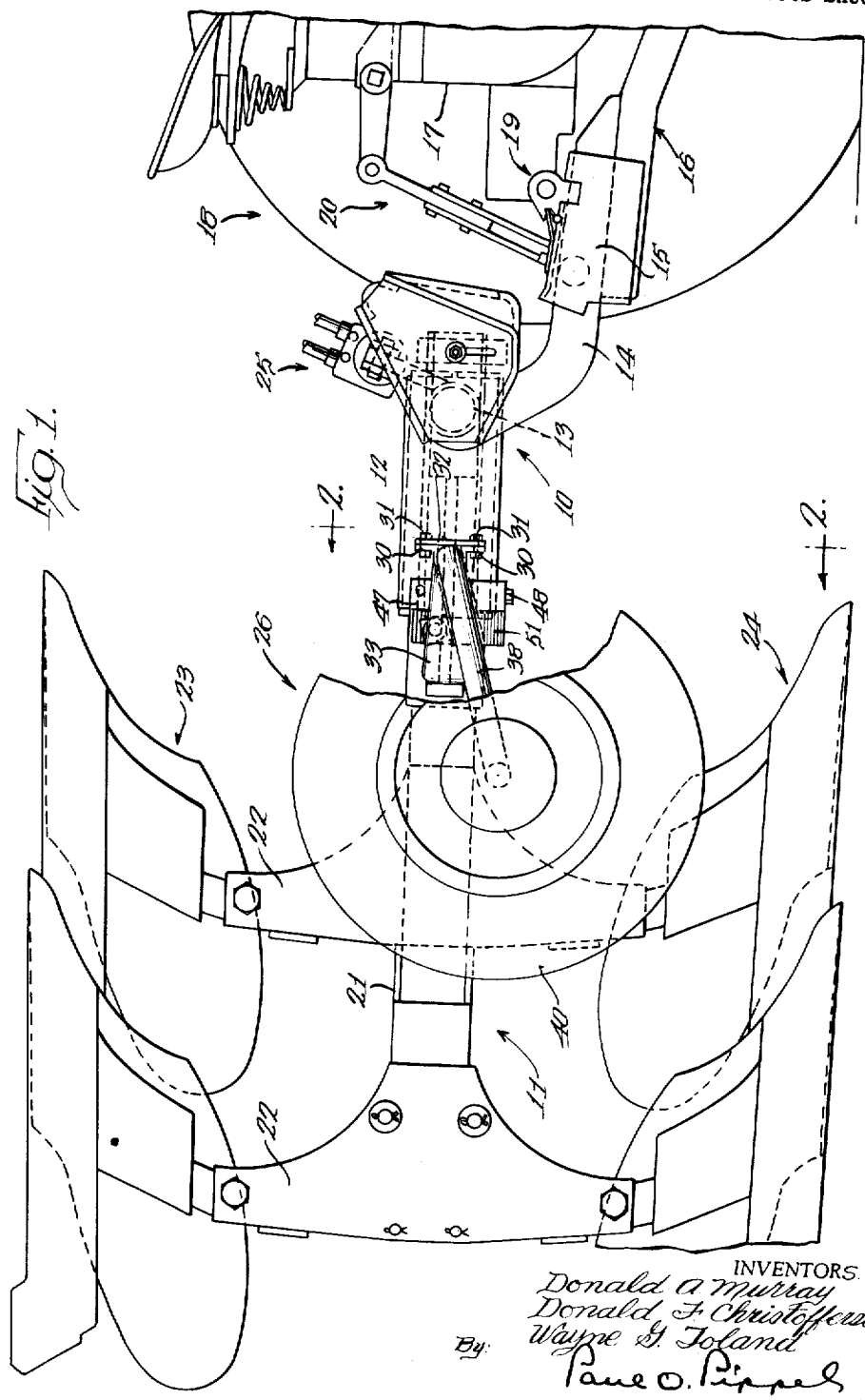

March 8, 1960     D. A. MURRAY ET AL     2,927,651
GAUGE WHEEL FOR TWO-WAY PLOW
Filed Feb. 15, 1957     3 Sheets-Sheet 3
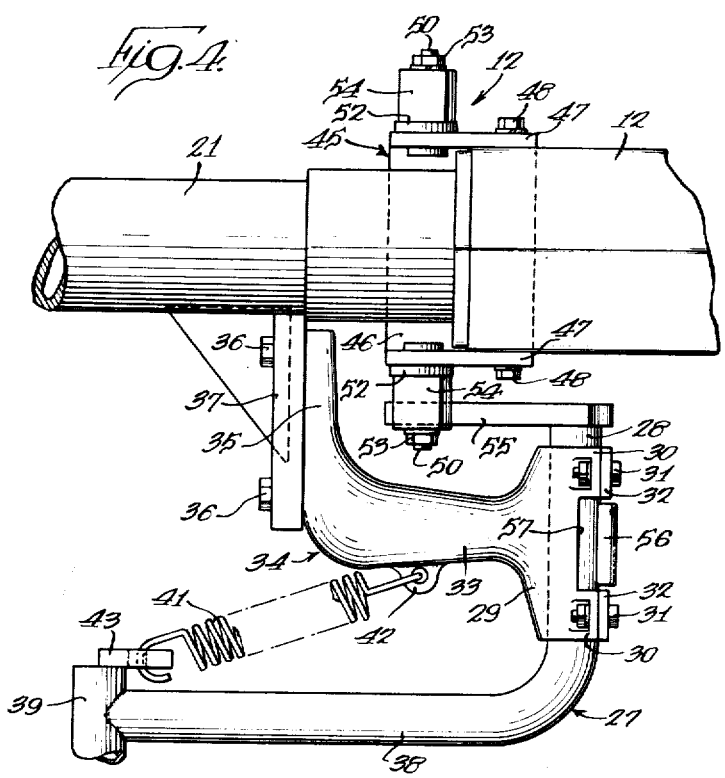
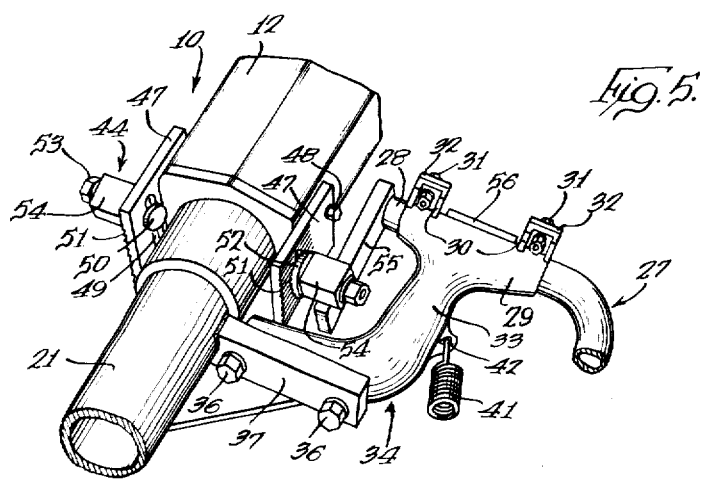
INVENTORS.
Donald A. Murray
Donald F. Christofferson
Wayne G. Toland

United States Patent Office 2,927,651
Patented Mar. 8, 1960

2,927,651

GAUGE WHEEL FOR TWO-WAY PLOW

Donald A. Murray, Donald F. Christofferson, and Wayne G. Toland, Stockton, Calif., assignors to International Harvester Company, a corporation of New Jersey Application February 15, 1957, Serial No. 640,555

8 Claims. (Cl. 172—212)

This invention relates to two-way plows and particularly to novel gauge wheel means serving both operating units thereof. The invention is specifically concerned with a two-way plow of the type that is rotatable about a horizontal longitudinal axis to alternately place the right and left-hand plow units in operating position.

An object of the invention is to provide in a rotary two-way plow a novel gauge wheel assembly, the position of which is reversible so that common gauging means can serve both plow units.

Another object of the invention is the provision in a two-way plow of the type wherein right and left-hand plowing units are mounted on a tool carrier for rotation to dispose one plow unit in operation while the other is raised of improved single gauge wheel means mounted on the carrier and rotatable with it to dispose the gauge wheel alternately in gauging relation with the operating plow unit.

Another object of the invention is to provide, for a two-way plow of the type referred to above, a crank axle supported gauge wheel that is bodily rotatable with the tool carrier about the axis thereof and is vertically swingable to opposite sides of the axis of the carrier when the latter is rotated, and means for holding the wheel in a neutral position alongside the tool carrier during rotation of the latter to avoid interference with other plow parts and to secure better control of the gauging means.

Other objects and advantages of the invention will become clear from the following detailed description when read in conjunction with the accompanying drawings wherein:

Figure 1 is a view in side elevation showing the rear end of a tractor, with one wheel removed, having mounted thereon a roll-over type of two-way plow embodying the features of this invention.

Figure 2 is a sectional view taken on the line 2—2 of Figure 1 illustrating in solid and dotted lines the manner in which the gauge wheel assembly rotates with the tool carrier bodily from one operating position to another, the path of movement of the gauge wheel being below the axis of the carrier;

Figure 3 is a section taken on the line 3—3 of Figure 2;

Figure 4 is a plan view, on an enlarged scale, of a detail showing the manner in which the gauge wheel is mounted and its operating position controlled; and Figure 5 is a perspective view, on a smaller scale, showing the structure of Figure 4.

The plow with which this invention is associated comprises a main supporting frame 10 and a tool-carrying subframe 11. Main frame 10 includes a longitudinally extending horizontal tubular member 12 having affixed near its forward end and extending laterally therefrom a tubular beam 13, to the ends of which are secured a pair of laterally spaced prongs or shafts 14, only one of which is shown, adapted for sliding reception in a pair of complementary socket members 15 forming a part of a draft structure 16 connected in draft-receiving relation to the body 17 of a propelling vehicle in the form of a tractor 18 having a conventional power plant. The shafts 14 are retained in sockets 15 by latch means indicated at 19, whereby a stable integral connection is made between the tractor and the implement, and vertical movement of the plow of this invention between operating and transport positions on the tractor is accomplished by lifting mechanism indicated at 20 connected to the draft structure 16 and actuated by suitable power means on the tractor and deriving its power therefrom to raise and lower the draft structure and implement.

The tool-carrying subframe 11 comprises an elongated tubular beam 21, the forward end of which is rotatably received and supported in tubular member 12, said beam having affixed thereto a pair of brackets 22 to which are secured alternately operating right and left-hand plowing units 23 and 24, respectively, spaced 180° apart. In Figure 1 of the drawings left-hand plowing unit 24 is shown in operating position. In order to move the plow unit 24 to an inoperative position when reversing the direction of travel at the end of a field to plow in the opposite direction, and to move the alternately operating right-hand plowing unit 23 into operating position, the power lift means 20 of the tractor is actuated to raise the plow above the ground. Tool beam 21 is then revolved 180° relative to the tubular supporting member 12. This reversal of the position of the operating units is accomplished by actuating mechanism indicated at 25, mounted on the main frame 10 and operatively connected to subframe 11 to rotate the latter through a half revolution. The details of construction of the reversing mechanism 25, as well as other constructional details of the plow frames 10 and 11 and draft structure 16 form no part of this invention. Further details of construction thereof may be had by reference to co-pending U.S. application Serial No. 615,195, filed October 10, 1956, now Patent 2,839,979 granted June 24, 1958.

The depth of operation of the plow units 23 and 24 is regulated by a gauging unit indicated at 26 comprising an axle structure 27 having a transverse portion 28 rotatably receivable in a bearing 29 having spaced ears 30. Ears 30 are apertured to receive bolts 31, by which plates 32 are secured to the lugs 30 to rotatably retain and hold axle 28 in bearing 29. Bearing 29 is formed at the end of the longitudinally bent arm 33 of a bracket 34 having a transverse portion 35 secured by bolts 36 to a bar 37 affixed to and projecting laterally from one side of the tubular tool carrier 21.

It will be noted that bar 37 is affixed to beam 21 near the juncture thereof with tubular member 12, and that the part 33 of bracket 34 extends horizontally forwardly in overlapping relation to the tubular member 12. Axle structure 27 includes a rearwardly and downwardly extending crank arm portion 38 having affixed to its end a transverse stub axle 39 upon which is rotatably mounted a gauge wheel 40.

It will be seen that gauging unit 26 revolves with the rotation of subframe 11 with respect to main frame 10 and that it is capable of assuming depth regulating relation to the alternately operating plow units 23 and 24. In other words, both of the plow units are gauged by a single gauging device. Where such gauging devices have been used previously, the gauge wheel which has assumed a position such as that shown in Figure 1 with the axis of the wheel below the axis of the tubular carrier 21 to gauge the depth of the operating plow unit must swing by gravity past the axis of the tubular carrier when by rotation of the carrier the gauge wheel is rolled over to the other side thereof and must fall to its proper operating relation with the alternately operating plow unit as it is moved into operating position. In order to control the gauge wheel during rotation with the carrier and to insure its positioning in the proper operating relation to the working plow unit, applicant has provided a coil spring 41 anchored at one end to a lug 42 on bracket 34 and at its other end to a lug 43 on the inner end of stub axle 39. Spring 41 biases the wheel-carrying axle 27 to a position with the crank portion 38 thereof substantially parallel to the axis of the subframe 11.

To hold the gauge wheel 40 in an operating position such as indicated in Figure 1 means are provided for overcoming the bias of spring 41 and forcing the crank 38 and wheel 40 downwardly into gauging relation with respect to the operating plow unit. Adjustable stop means limiting upward movement of crank 38 and wheel 40 with respect to the plow frames is indicated at 44 and comprises a U-shaped bracket 45 having a transverse portion 46 extending below frame member 12 and having upstanding arms 47 straddling the stationary main frame member 12 and secured thereto by bolts 48.

Only a portion of arms 47 and transverse base portion 45 of the member 44 engage the frame member 12, the rear portion of the bracket projecting beyond the rear end of the member 12. The rearwardly projecting portion of each arm 47 is provided with a vertical slot 49 having slidably received therein the shank of a bolt 50.

The outer face of each of the arms 47 is provided with a plurality of serrations 51 and a washer 52 carried by each bolt 50 is provided with complementary serrations for engagement with the serrations 51. The end of each bolt 50 is threaded to receive a nut 53 and an eccentric rectangularly shaped block 54 is mounted upon the bolt between nut 53 and washer 52.

When the implement is raised to transport position on the tractor by operation of the lifting means 20, and the tool carrier 11 is revolved 180° by the reversing apparatus indicated at 25, the gauge wheel assembly is revolved with it, as indicated in dotted lines in Figure 2, the gauge wheel following an arcuate path beneath the axis of the tool carrier to a reversed position for gauging the alternately operating plow unit. As pointed out hereinbefore, spring 41 biases the crank arm 38 and wheel 40 to a position in substantial alignment with the axis of the tool carrier 21 and with crank arm 38 substantially parallel thereto. From this neutral position crank arm 38 swings to opposite sides of the axis of tool carrier 21 for gauging the two sets of plow bottoms. When the gauge wheel unit is in gauging position the block 54 on one side of the axis of the main frame 12 is engaged by a lever arm 55 affixed to the end of transverse axle portion 28 parallel to the plane of crank arm 38 and tool carrier 21, crank arm 38 and the wheel 40 mounted thereon being swung in a vertical plane to a position such as indicated in Figure 1 by engagement with block 54 and against the tension in spring 41.

When the implement is lifted to reverse the direction of plowing and revolve the tool carrier 21 from the solid line position of Figure 2 to the dotted line position thereof, spring 41 biases the crank 38 into substantial parallelism with the axis of tool carrier 21 as the lever 55 moves away from block 54 on that side of the machine. As the gauge wheel swings 180° to the other dotted line operating position thereof and the plow is lowered the lever 55 engages block 54 on the other side of the axis of the tool carrier, thus rocking the axle structure 27 and urging the gauge wheel 40 to the proper operating relation with the tool carrier.

Adjustment in the operating depth of the earth working tools is made by adjusting vertically the position of bolts 50 in slot 49. Additional adjustments may be made by rotating the eccentric block 54 to present, for engagement with lever 55, faces of the block which are at different distances from the axis of the bolt 50. Counterclockwise rocking of crank axle 38 as viewed in Figure 1 is limited by the provision of a lug 56 affixed to and projecting from the transverse axle portion 28 between the ears 30 of bearing 29 and engageable with an edge 57 of the bearing.

It is believed that the novel gauge wheel apparatus of this invention will be clearly understood from the foregoing description. It should likewise be understood, however, that the invention has been described only in its preferred embodiment and that modifications may be made therein without departing from the spirit of the invention or the scope of the appended claims.

What is claimed is:

1. In a two-way plow having a main frame and a tool-carrying subframe including alternately operable right and left-hand plow units and mounted on the main frame for rotation about a longitudinal axis to alternately place one plow unit in operation while the other is raised, power lifting means for raising said main and subframes above the ground to accommodate said rotation of the subframe, a gauge wheel unit mounted on the subframe on one side of and below the axis of rotation thereof for gauging the operating depth of one of said plow units, said gauge wheel unit being rotatable bodily with the subframe to a position on the other side of and adapted to swing downwardly by gravity to a position below said axis when the other of said plow units is moved into operating position to gauge the operating depth thereof, means operatively connected between said wheel and said subframe for overcoming the effect of gravity and holding said wheel unit in a neutral position in alignment with said axis during rotation of the subframe, and cooperable means on said main frame and said wheel unit effective in response to movement of the latter with the subframe to an alternate operating position, to force the gauge wheel unit downwardly below the axis of the subframe and into gauging relation with the alternately operating plow unit.

2. In a two-way plow having a main frame and a tool-carrying subframe including alternately operable right and left-hand plow units and mounted on the main frame for rotation about a longitudinal axis to alternately place one plow unit in operation while the other is raised, power lifting means for raising said main and subframes above the ground to accommodate said rotation of the subframe, a gauge wheel unit mounted on the subframe on one side of the axis of rotation thereof for gauging the operating depth of one of said plow units, said gauge wheel unit being adapted to swing downwardly by gravity to its gauging position and rotatable bodily with the subframe to a position on the other side of said axis when the other of said plow units is moved into operating position to gauge the operating depth thereof and spring means operatively connected between said wheel unit and said subframe adapted to overcome the effect of gravity and bias the gauge wheel unit to a neutral position alongside and in alignment with the axis of the subframe during rotation of the latter.

3. In a two-way plow having a main frame and a tool-carrying subframe including alternately operable right and left-hand plow units and mounted on the main frame for rotation about a longitudinal axis to alternately place one plow unit in operation while the other is raised, power lifting means for raising said main and subframes above the ground to accommodate said rotation of the subframe, a gauge wheel unit mounted on the subframe on one side of and below the axis of rotation thereof for gauging the operating depth of one of said plow units, said gauge wheel unit being rotatable bodily with the subframe to a position on the other side of and below said axis when the other of said plow units is moved into operating position to gauge the operating depth thereof, spring means operatively connected between said wheel unit and said subframe adapted to bias the gauge wheel unit to a neutral position alongside and in alignment with the axis of the subframe during rotation of the latter, and abutment means on the wheel unit and on said main frame engageable during rotation of the latter to overcome the bias of said spring means to force the wheel unit into gauging relation with respect to the alternately operating plow unit.

4. In a two-way plow having a main frame and a tool-carrying subframe including alternately operable right and left-hand plow units and mounted on the main frame for rotation about a longitudinal axis to alternately place one plow unit in operating position while the other is raised, power lifting means for raising said main and subframes above the ground to accommodate said rotation of the subframe, a gauge wheel, and means mounting the gauge wheel on the subframe for rotation therewith to opposite sides of the axis thereof to positions in gauging relation with the alternately operating plow units, comprising an axle member mounted on the subframe at one side thereof and rotatable on an axis perpendicular thereto, said axle member including a crank arm portion bent generally at right angles to the axis of said member and carrying said gauge wheel at its end for swinging in a generally vertical plane between alternate operating positions with respect to said alternately operating plow units, and a spring operatively connected to said subframe and to said crank arm portion to bias the latter to a neutral position substantially parallel to the axis of the subframe during rotation of the latter.

5. In a two-way plow having a main frame and a tool-carrying subframe including alternately operable right and left-hand plow units and mounted on the main frame for rotation about a longitudinal axis to alternately place one plow unit in operating position while the other is raised, power lifting means for raising said main and subframes above the ground to accommodate said rotation of the subframe, a gauge wheel, and means mounting the gauge wheel on the subframe for rotation therewith to opposite sides of the axis thereof to positions in gauging relation with the alternately operating plow units, comprising an axle member mounted on the subframe at one side thereof and rotatable on an axis perpendicular thereto, said axle member including a crank arm portion bent at right angles to the axis of said member and carrying said gauge wheel at its end for swinging in a vertical plane between alternate operating positions with respect to said alternately operating plow units, a spring operatively connected to said subframe and to said crank arm portion to bias the latter to a neutral position substantially parallel to the axis of the subframe during rotation of the latter, and means on the main frame operatively engageable with said axle member during rotation of the subframe to swing the crank arm in a generally vertical plane to a position in gauging relation to the plow unit in operating position.

6. In a two-way plow having a main frame and a tool-carrying subframe including alternately operable right and left-hand plow units and mounted on the main frame for rotation about a longitudinal axis to alternately place one plow unit in operating position while the other is raised, power lifting means for raising said main and subframes above the ground to accommodate said rotation of the subframe, a gauge wheel, and means mounting the gauge wheel on the subframe for rotation therewith to opposite sides of the axis thereof to positions in gauging relation with the alternately operating plow units, comprising an axle member mounted on the subframe at one side thereof and rotatable on an axis perpendicular thereto, said axle member including a crank arm portion bent generally at right angles to the axis of said member and carrying said gauge wheel at its end for swinging in a generally vertical plane between alternate operating positions with respect to said alternately operating plow units, a spring operatively connected to said subframe and to said crank arm portion to bias the latter to a neutral position substantially parallel to the axis of the subframe during rotation of the latter, said gauge wheel being rotatable with the subframe in a path below the axis of the latter from one side of the subframe to the other to gauge the alternately operating plow units, a lever mounted on the axle member and swingable therewith and stop means on the main frame on opposite sides thereof alternately engageable with said lever upon rotation of the subframe to overcome the bias of said spring and swing said gauge wheel in a generally vertical plane and hold it it in its operating position.

7. The invention set forth in claim 6, wherein said stop means is adjustable to vary the operating position of the gauge wheel.

8. In a two-way plow having a main frame and a tool-carrying subframe including alternately operating right and left-hand plow units and mounted on the main frame for rotation about a longitudinal axis to alternately place one plow unit in operation while the other is raised, gauge wheel means movable with the tool-carrying subframe about said longitudinal axis to opposite sides of the latter to alternately serve as a gauging means for the respective plow units, comprising a wheel-carrying crank axle extending downwardly at an angle to the axis of the subframe in the operating position of the wheel with respect to the plow unit in operating position and having a transverse axle portion rotatably mounted on the subframe to accommodate swinging of the crank axle in a vertical plane, a spring operatively connected between the subframe and said crank axle to hold the latter generally parallel to the axis of the subframe during rotation thereof, a lever secured to said transverse axle portion and a stop on the main frame in the path of movement of said lever during rotation of the subframe and engageable with said lever to rock the crank-axle in a vertical plane relative to the subframe against the bias of said spring.

References Cited in the file of this patent

UNITED STATES PATENTS

| 2,760,420 | Pursche | Aug. 28, 1956 |
| 2,773,439 | Chandler | Dec. 11, 1956 |
| 2,860,563 | Zahn et al. | Nov. 18, 1958 |

FOREIGN PATENTS

| 1,107,356 | France | Dec. 30, 1955 |
| 752,103 | Great Britain | July 4, 1956 |